Figure 1:
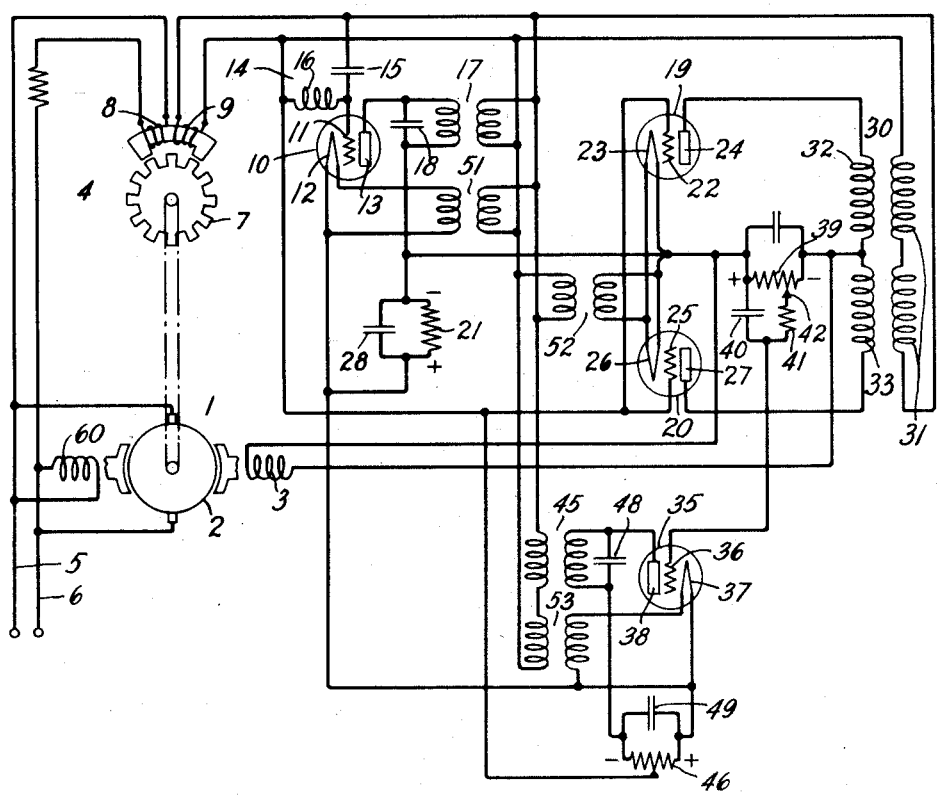

June 10, 1930.　　E. C. MANDERFELD　　1,762,999

REGULATOR SYSTEM

Filed Feb. 28, 1929

INVENTOR.
E. C. MANDERFELD
BY Wayne B Wells
ATTORNEY

Patented June 10, 1930

1,762,999

UNITED STATES PATENT OFFICE

EMANUEL C. MANDERFELD, OF BOONTON, NEW JERSEY, ASSIGNOR TO BELL TELEPHONE LABORATORIES, INCORPORATED, OF NEW YORK, N. Y., A CORPORATION OF NEW YORK

REGULATOR SYSTEM

Application filed February 28, 1929. Serial No. 343,527.

This invention relates to regulator systems employing thermionic vacuum tubes and particularly to regulator systems for maintaining the speed of motors substantially constant.

One object of the invention is to provide a dynamo-electric machine with a regulator system employing a thermionic detector tube to maintain a characteristic of the machine constant and that shall include an improved feed-back circuit conected to the detector grid for compensating the regulating operation.

Another object of the invention is to provide a dynamo-electric machine with a regulator system employing a thermionic detector tube coupled with an amplifier effecting direct amplification in accordance with the operation of the detector tube to maintain a characteristic of the machine constant and that shall have a potential impressed on the grid of the detector tube varying indirectly according to the amplifier output to compensate the regulating action.

A further object of the invention is to provide a motor speed regulator system with a source of alternating current having a frequency varying according to the motor speed and a detector tube having a potential impressed on the grid thereof from said source of alternating current according to the speed of the motor by means comprising a circuit tuned to a frequency slightly above the frequency of the source when the motor is operating at normal speed.

In regulating a dynamo-electric machine to maintain a characteristic thereof constant it is desirable to employ thermionic vacuum tubes in place of electromagnetic relays in the regulator system to avoid the delay caused by moving mechanical parts. The characteristic to be regulated may, for example, be the speed of a motor or the voltage or frequency of a generator. A regulator system, as for example, a speed regulator system for a motor will operate upon change in voltage of the supplied power or in the load to hold the motor at a constant speed. However, unless some compensating means is provided the regulator system will, upon change in line voltage or load, hold the motor at a constant speed slightly off the normal speed.

The present invention provides means for compensating the regulating operation to hold the motor at constant normal speed regardless of changes that may be effected in the motor load or the voltage of the power supplied to the motor.

In the disclosed invention a small inductor type generator is directly connected to the regulated motor for supplying a current, the frequency of which varies in accordance with the motor speed. A circuit, which is tuned to a frequency slightly above the frequency of the generator when the motor is operating at normal speed, is provided for connecting the generator to the input circuit of a detector tube. The detector tube is preferably supplied with alternating plate potential from the generator, although any other available source of plate potential may be used. Suitable coupling means as, for example, a coupling resistance is provided for coupling the output circuit of the detector tube to two thermionic amplifier tubes connected in parallel circuit relation. The amplifier tubes are coupled to the detector tube by the coupling resistance to effect direct amplification of the output from the detector tube. The output circuits of the amplifier tubes are connected to a field winding of the motor in order to control the motor excitation to maintain the motor speed constant.

In a regulator system constructed as above set forth, the motor speed will be maintained constant, but upon change in line voltage or load the regulator will not always bring the motor back to exactly normal speed. Upon change in line voltage or load the motor speed will be held constant at slightly above or below the normal speed. In order to compensate for the slight change in speed that is liable to occur upon change in line voltage or load, a feed-back is taken from the output circuit of the amplifier tubes to the grid of the detector tube. In the disclosed invention a compensating thermionic tube is provided in the feed back circuit cuit in order to impress a potential on the grid of the detector which varies inversely with the output of the amplifier tubes.

In the patent to E. C. Manderfeld 1,662,071, dated March 13, 1928, is disclosed a similar regulating system wherein two amplifier tubes, connected in parallel circuit relation, effect inverse amplifications of the output from a rectifier tube to which they are connected. In this sytsem it will be noted that feed-back from the amplifier output circuit impresses a potential on the rectifier tube which varies directly in accordance with the output from the amplifier tubes. In the system disclosed in the patent, the rectifier tube is controlled by a low pass filter to effect a regulating operation on the steeply inclined cut-off portion of the curve representing the operation of the low-pass filter.

In the system disclosed in the drawing, a tuned circuit is provided for connecting a pilot generator to a detector tube. The detector tube operates to effect a regulating action at a frequency below the frequency to which the tuned circuit is tuned. Thus the regulating operation is effected on the positive slope of the curve for the tuned circuit. It is an advantage to operate on the steeply inclined positive slope of the tuned circuit curve in order to avoid the necessity of having to operate the motor above a certain speed before the regulator can be placed in operation. This difficulty is avoided in the patent to Manderfeld by providing a low-pass filter in place of a tuned circuit. The present invention discloses a compensating feed-back circuit which may be used with a regulator system employing a tuned circuit for regulating purposes and operating on the positive slope of the tuned circuit curve.

Figure 2:
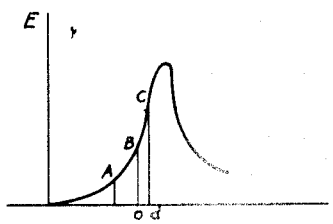

In the accompanying drawing Figure 1 is a diagrammatic view of a regulator system constructed in accordance with the invention:

Fig. 2 is a view showing the curve for the tuned circuit to facilitate explaining the invention.

Referring to Fig. 1 of the invention a motor 1 comprising an armature 2, a shunt field-magnet winding 60 and a regulating field-magnet winding 3 is directly connected to a generator 4. The motor 1, which is preferably a shunt-wound motor, is connected to a supply circuit comprising conductors 5 and 6. The inductor type generator comprises a rotor 7, an exciting field winding 8 and an armature winding 9.

A detector tube 10 comprising a grid 11, a filament 12 and a plate 13 is coupled to the armature winding 9 of the generator 4 by a tuned circuit 14. The tuned circuit 14 comprises a condenser 15 and an inductance element 16. The generator 4 being directly connected to the motor 1, supplies current having a frequency which varies directly in accordance with the motor speed. The tuned circuit 14 is tuned to a frequency slightly above the frequency produced by the generator 4 when the motor is operated at normal speed. A transformer 17, which is connected to the armature circuit of the generator, is provided for supplying space current to the detector tube 10. A condenser 18 serves to smooth out ripples in the space current.

Two rectifier-amplifier tubes 19 and 20 are coupled to the output circuit of the detector tube 10 by a resistance element 21 for controlling the excitation of the motor field winding 3. The amplifier tube 19 comprises a grid element 22, a filament 23, and a plate 24. The amplifier tube 20 comprises a grid 25, a filament 26 and a plate 27. A condenser 28, which is connected across the coupling resistance element 21, serves to suppress the voltage fluctuations across the coupling resistance.

A transformer 30 having a primary winding 31 and secondary windings 32 and 33 is provided for supplying plate voltage from the generator 4 to the amplifier tubes 19 and 20. The primary winding 31 is directly connected to the armature circuit of the generator and the secondary windings 32 and 33 are respectively connected in the output circuits of the amplifier tubes 19 and 20. A compensating thermionic tube 35 comprising a grid 36, a filament 37 and a plate 38 is provided for controlling a feed-back circuit from the output circuits of the amplifier tubes 19 and 20 to the grid 11 of the detector tube 10. A resistance element 39, which is connected across the motor field winding 3 in the output circuits of the amplifier tubes 19 and 20, is adjustably connected to the input circuit of the compensating tube 35. A condenser 40 and a resistance element 41 are provided in the input circuit of the compensating tube 35 to effect a delayed feed-back in the manner disclosed in the patent to H. M. Stoller No. 1,662,085, dated March 13, 1928. The grid 36 of the compensating tube 35 is connected to an adjustable point 42 on the resistance element 39, and the filament 37 of the compensating tube 35 is connected to one terminal of the resistance element 39 through the coupling resistance 21.

A transformer 45, which is connected to the armature circuit of the generator 4, is provided for supplying plate voltage to the compensating tube 35. A potentiometer 46 in the output circuit of the compensating tube controls the negative potential impressed on the grids of the amplifier tubes 19 and 20 and the detector tube 10. The grids of the amplifier tubes and the detector tube are connected to an adjustable point on the potentiometer 46 and the filaments of the tubes are connected to one terminal of such potentiometer. The condensers 48 and 49 are provided to suppress voltage fluctuations. Transformers 51, 52 and 53 which are connected to the armature circuit of the generator supply filament current respectively to the detector tube, the amplifier tubes and the compensating tube.

In the tuned circuit curve shown in Fig. 2 of the drawing the ordinates represent the potential impressed on the grid of the detector tube by the tuned circuit and the abscissæ represent the frequency of the current produced by the generator 4. When the motor is operated at normal speed a frequency $o$ corresponding to a point B on the tuned circuit curve is produced by the generator 4.

Assuming the line voltage is raised or the load in the motor 1 is reduced, the motor will tend to increase in speed and to operate the generator so as to develop a frequency, for example, corresponding to $d$ as shown in Fig. 2 of the drawing. The rise in frequency of the current supplied by the generator to the tuned circuit 14 lowers the negative potential which is impressed on the detector grid 11. The detector tube 10 operates to increase the potential drop across the coupling resistance 21. The coupling resistance lowers the negative potential impressed on the grids 22 and 25 of the amplifier tubes 19 and 20 to increase the space current flow and accordingly increase the current flow through the regulating field winding 3. The increase in the field winding current reduces the motor speed.

However, without some compensating means the detector tube and the amplifier tubes will not return the motor exactly to normal speed. The regulating system will operate to hold the speed of the motor a trifle higher than the normal speed. In the curve shown in Fig. 2 of the drawing the regulating operation would hold the motor speed constant at a point slightly higher on the positive slope of the tuned circuit curve than the point B.

In order to return the motor speed to normal value a negative potential is impressed on the grid of the compensating tube 35 from the resistance element 39. The increased negative potential impressed on the grid 36 of the compensating tube lowers the potential drop across the potentiometer 46. The lowering of the potential drop across the potentiometer 46 further lowers the negative potential impressed on the grid 11 of the detector tube and the grids 22 and 25 of the amplifier tube. This change in the potential impressed upon the grid of the detector and amplifier tubes by the compensating tube lowers the motor speed a trifle so as to return the motor exactly to normal speed. In this operation it will be noted a potential is impressed on the grid of the detector tube which varies inversely with the output from the amplifier tubes.

In the above system it will be noted the amplifier tubes 19 and 20 effect direct amplification of the output from the detector tube and the regulating operation is effected on the positive slope of the tuned circuit curve as shown in Fig. 2. If the amplifier tubes 19 and 20 effect inverse amplification of the output from the detector tube 10, it would be necessary to effect a regulating operation on the negative slope of the tuned circuit curve shown in Fig. 2 of the drawing. In this latter case it would be necessary for the motor to operate the generator 4 to produce voltage having a frequency above the tuning point of the tuned circuit before the regulating circuits could be placed in operation. In this last mentioned case compensation may be effected in the manner disclosed in the above mentioned Manderfeld patent. However, in the system disclosed in the drawing where the regulating operation is effected on the positive slope of the tuned circuit curve means must be provided for impressing a potential on the grid which varies inversely with the output from the amplifier tubes.

If the line voltage supplied to the motor is reduced or the load on the motor is increased the frequency of the voltage produced by the generator 4 is lowered to increase the negative potential impressed on the grid of the detector tube. The increased negative potential on the detector grid lowers the potential drop across the coupling resistance 21 to increase the negative potential impressed on the grids 22 and 25 of the amplifier tubes 19 and 20. The space current flow through the amplifier tubes is lowered to reduce the current flow through the regulating field winding 3. The reduction in the motor field excitation increases the motor speed. At the same time, the reduced potential impressed on the coupling resistance 39 lowers the negative potential impressed on the grid 36 of the compensating tube 35. The potential drop across the potentiometer 46 is raised to increase the negative potential impressed on the grids of the detector and amplifier tubes to compensate the regulating operation and further increase the motor speed so that the motor is held at a constant normal speed. The feed-back from the output circuits of the amplifier tubes is delayed by the condenser 40 and the resistance elements 41 in the manner disclosed in the Stoller Patent 1,662,085 so as to stabilize the regulating operation.

Modifications in the system and in the arrangement and location of parts may be made within the spirit and scope of the invention, and such modifications are intended to be covered by the appended claims.

What is claimed is:

1. In a regulator system, a dynamo-electric machine, a thermionic tube, means for operating said tube in accordance with a characteristic of said machine, means comprising an amplifier effecting direct amplification of the output from said tube for controlling said machine to maintain the characteristic thereof constant, and means for impressing a potential on said thermionic tube which varies inversely with the output of said amplifier to compensate the regulating operation.

2. In a regulator system, a dynamo-electric machine, a thermionic tube, means for operating said tube in accordance with a characteristic of said machine, means comprising an amplifier effecting direct amplification of the output from said tube for controlling the machine to maintain the characteristic thereof constant, and means for impressing with a time lag a potential on said tube which varies inversely with the output of said amplifier.

3. In a speed regulator system, a motor, a thermionic detector tube, means for operating said detector tube according to the motor speed, means comprising an amplifier effecting direct amplification of the output from said detector tube for controlling said motor to maintain the speed thereof constant, and means comprising a thermionic tube for impressing a potential on the grid of said detector tube which varies inversely with the output of said amplifier to compensate the regulating operation.

4. In a regulator system, a dynamo-electric machine, a three element thermionic tube, means for operating said tube in accordance with a characteristic of said machine, means comprising a thermionic amplifier effecting direct amplification of the output from said three element tube for controlling the machine to maintain the characteristic thereof constant, and means for impressing a potential on the grid of said three element tube which varies inversely with the output of said amplifier to compensate the regulating operation.

5. In a speed regulator system, a motor having a regulating field winding, a source of alternating current having a frequency varying in accordance with the motor speed, a three element detector tube, means for impressing on said detector tube a potential from said source which varies according to the frequency of the current from said source, means comprising an amplifier effecting direct amplification of the output from said detector tube for controlling said field winding to maintain the motor speed constant, and means for impressing a potential on said detector tube which varies inversely with the output of said amplifier to compensate the regulating operation.

6. In a speed regulator system, a motor, a source of alternating current having a frequency varying according to the motor speed, a thermionic detector tube, a tuned circuit for impressing potential from said source on the grid of said detector tube, said tuned circuit being tuned to a frequency slightly above the frequency of said source when the motor is operating at normal speed, means comprising an amplifier effecting direct amplification of the output from said detector tube for governing said motor to maintain the speed thereof constant, and means for impressing a potential on the detector grid which varies inversely with the output of said amplifier to compensate the regulating operation.

7. In a speed regulator system, a motor having a regulating field winding, a generator operated by said motor to produce current having a frequency varying according to the motor speed, a thermionic detector tube, means for impressing a potential from said generator on the detector grid which varies according to the generator frequency, means comprising a thermionic amplifier effecting direct amplification of the output from said detector tube for governing said field winding to maintain the motor speed constant, and means for impressing a potential on the detector grid which varies inversely with the output of said amplifier to compensate the regulating operation.

8. In a speed regulator system, a motor having a regulating field winding, a generator operated by said motor to produce current having a frequency varying according to the motor speed, a thermionic detector tube, a tuned circuit for connecting the input circuit of said detector tube to the generator, said tuned circuit being tuned to a frequency slightly above the generator frequency when the motor is operating at normal speed, means comprising an amplifier effecting direct amplification of the output from said detector tube for governing said field winding to maintain the motor speed constant, and means for impressing a potential on the detector grid which varies inversely with the output of said amplifier to compensate the regulating operation.

9. In a speed regulator system, a motor having a regulating field winding, a generator operated by said motor to produce a frequency varying according to the motor speed, a thermionic detector tube supplied with space current by said generator, a tuned circuit for connecting the input circuit of said detector tube to said generator, said tuned circuit being tuned to a frequency slightly above the generator frequency when the motor is operating at normal speed, means comprising a thermionic amplifier effecting direct amplification of the output from said detector tube for governing said field winding to maintain the motor speed constant, means for supplying plate voltage to said amplifier from said generator, and means comprising a thermionic tube connected to the output circuit of said amplifier for impressing a potential on the detector grid which varies inversely with the output of said amplifier to compensate the regulating operation.

10. In a regulator system, a dynamo-electric machine, a source of alternating current having a frequency varying according to a characteristic of said machine, means comprising an amplifier detector for controlling the characteristic of said machine, means for operating said amplifier detector according to the frequency of said source of alternating current, and means for impressing a compensating potential on the grid of said amplifier detector which varies inversely with the output from the amplifier detector.

11. In a regulator system, a dynamo-electric machine, a source of alternating current having a frequency varying according to a characteristic of said machine, means comprising an amplifier detector for controlling the characteristic of said machine, a tuned circuit for connecting said source of alternating current to the input circuit of said amplifier detector, and means for impressing a compensating potential on the grid of said amplifier detector which varies inversely with the output from the amplifier detector.

In witness whereof, I hereunto subscribe my name this 27th day of February, 1929.

EMANUEL C. MANDERFELD.